United States Patent [19]

King

[11] 4,033,598
[45] July 5, 1977

[54] ARCH AXLE SULKY

[76] Inventor: Joseph H. King, 930 John Anderson Drive, Ormond Beach, Fla. 32074

[22] Filed: July 26, 1976

[21] Appl. No.: 708,523

[52] U.S. Cl. .............................................. 280/63
[51] Int. Cl.² ..................................... B62D 27/04
[58] Field of Search .............. 280/63, 281; 296/1 S

[56] References Cited

UNITED STATES PATENTS

| 512,686 | 1/1894 | Dentler | 280/63 |
|---|---|---|---|
| 3,173,706 | 3/1965 | Britten | 280/63 |
| 3,482,851 | 12/1969 | Pickard | 280/63 |
| 3,847,408 | 11/1974 | King | 280/63 |

*Primary Examiner*—Robert R. Song
*Attorney, Agent, or Firm*—Jones, Tullar & Cooper

[57] ABSTRACT

A sulky comprising a flexible arch constructed of high strength tubular steel having a streamlined cross section, the arch carrying a pair of wheels supported at its outer ends on individual axles mounted behind the torsional axis of the arch is disclosed. A pair of spaced, forwardly extending, flexible shafts are mounted at the top of the arch on either side of an adjustable driver's seat, the shafts being angled upwardly and inwardly toward each other and having a streamlined cross section which is canted outwardly. The shafts are formed of tubular, high strength, flexible steel and cooperate with the flexible arch axle to provide an interaction between the driver of the sulky, the motion of the horse, and the sulky itself to produce improved performance. Stirrup mounts for the driver's feet are secured to the shafts and are adjustable to cooperate with the adjustable driver's seat to permit optimum placement of the driver with respect to the arch axles. A first protective support bar extends forwardly from each axle to a connection point with the shaft on the corresponding side of the sulky and a second protective bar leads from the axle over the top of the wheel to the arch axle to provide stability to the sulky, and to prevent it from being damaged by contact with railings or other obstacles with which it might come in contact.

7 Claims, 11 Drawing Figures

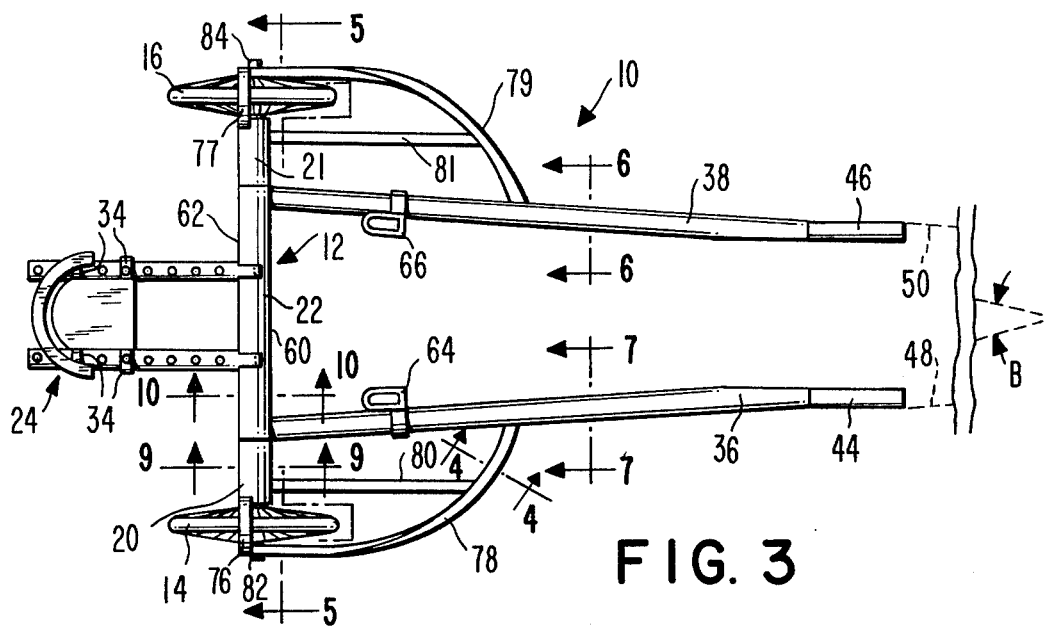
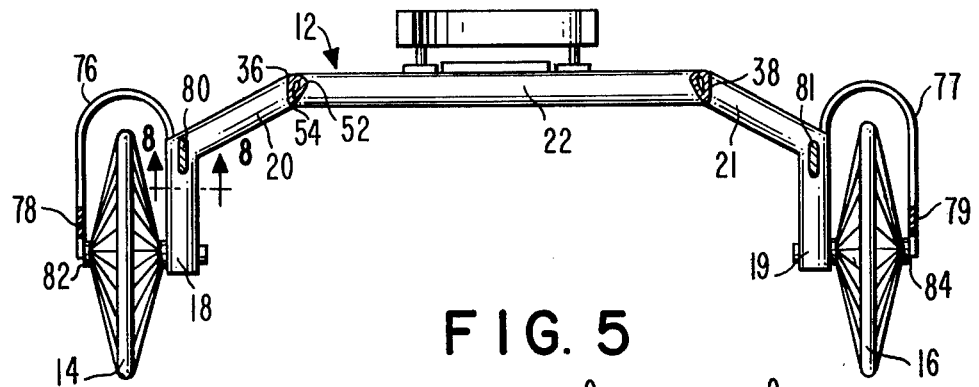
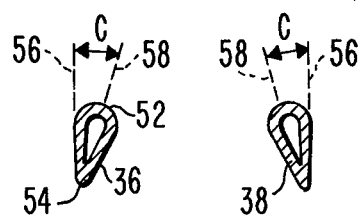

ARCH AXLE SULKY

BACKGROUND OF THE INVENTION

The present invention relates, in general, to a racing vehicle specifically developed for use in horse racing and which is an improvement over the vehicle disclosed and claimed in U.S. Pat. No. 3,847,408. More particularly, the present invention relates to a double shafted arch axle sulky fabricated from high strength steel alloy tubes having a tear-drop cross section for streamlining to provide a sulky that is light in weight, strong, produces less drag and which thereby improves the performance of the horse to which it is harnessed.

Until the advent of the single-shafted sulky disclosed and claimed in U.S. Pat. No. 3,847,408, which issued on Nov. 12, 1974 to the applicant herein, there had been little change in the sulkys used in harness horse racing in many years. The previous sulkys had been derived through evolution and adaptation of the single horse-drawn buggy, and little had been done to improve it other than to reduce it in size and reduce it to a two-wheeled vehicle. The single-shafted sulky was a dramatic step forward in the art of sulkys for horse racing, in that it represented the first real departure from prior systems and represented a new approach to the art of designing sulkys. The single-shafted sulky had numerous advantages, as described in the above-mentioned patent, and was successfully used for a period of time. However, for a variety of reasons the single-shafted sulky was held to be unuseable on commercial harness racing tracks and accordingly there developed a need for a sulky which would meet the technical requirements of harness racing tracks for sulkys, while providing the improved performance characteristics of the single-shafted sulky.

SUMMARY OF THE INVENTION

It was, therefore, an object of the present invention to produce a harness racing sulky that would overcome the disadvantages of prior conventional sulkys and would equal the performance of the above-mentioned single-shafted sulky while still meeting the requirements of the harness racing track.

Another object of the invention was to provide an improved sulky which would increase the speed of a horse to which it was harnessed, and improve its ability to sustain its speed over the distance of a race.

Another object of the invention was to provide a sulky that is light in weight, easy to handle, and which cooperates with the horse to provide maximum speed with minimum effort.

A further object of the invention was to provide a light-weight, strong sulky, having decreased air resistance, improved tracking, and an improved driver's position to produce consistently greater speed in a safe, reliable manner.

The foregoing objects and features are accomplished by the vehicle described herein through the provision of an aerodynamically sound design and construction wherein the sulky is shaped to cooperate with the horse and to position the driver in such a way as to provide markedly decreased air or wind resistance and to thereby increase the speed of the horse in a manner never before accomplished. The sulky of the present invention utilized an arch axle similar to that of the prior single-shafted sulky with the difference that the present device is fabricated of a tubular steel having a cross section that is generally tear-dropped in shape, and which thus takes the form of an aerodynamically designed air foil which presents minimum resistance to the flow of air during a race.

The arch axle extends in a series of segments across the width of the sulky, with the central segment being generally horizontal and carrying the driver's seat. Connected to the arch axle at the opposite ends of the central segment and extending upwardly and forwardly therefrom are a pair of shafts which are adapted to extend on either side of the horse to which the sulky is to be connected by means of suitable harness arrangements (not shown). The shafts are also constructed of a tubular steel having a tear drop cross section, with the thin edge of the tear drop-shape being canted downwardly and outwardly to again provide minimum resistance to the flow of air during the use of the sulky. The shafts and the arch axle are of a flexible material so that the motion of the horse and of the driver as the sulky is drawn will cause the axle and shafts to bend and flex in resonance with the motion to assist rather than inhibit the movement of a horse during a race. Protective struts, or bars, extend around the wheels to prevent them from catching on obstacles such as the railings and fence posts that define the limits of the track on which the race takes place. The wheels are mounted on axles secured at the outermost segments of the arch axle, the wheel axles being set slightly back of the torsional axis of the arch. This location of the wheel axle provides a castering effect when vertical forces are applied to the cross member of the arch by the weight of the driver or the motion of the horse, and this castering effect assists in the forward motion of the sulky.

The construction of this sulky overcomes the problems experienced both with conventional racing vehicles and the single-shafted sulky disclosed in U.S. Pat. No. 3,847,408, while providing numerous advantages. The streamlined shape of the sulky and the driver position provided by its structure provides a substantial reduction of wind drag, while the dynamics of the shaft and axle cause the sulky to become attuned to the characteristics of various horse and drivers whereby maximum speed can be attained from a horse. The sulky so constructed is safe, fast, and because of the fact that its characteristics have proven in actual usage to provide startlingly improved results in race environments, has achieved a high degree of acceptance among professionals in the harness racing industry in a very short period of time.

BRIEF DESCRIPTION OF THE DRAWINGS

The foregoing and additional objects, features and advantages of the present invention will become apparent from the following detailed description of the preferred embodiment thereof taken in conjunction with the accompanying drawings in which:

FIG. 3 is a top plan view of the sulky of FIG. 1;

FIG. 4 is a cross-sectional view of a portion of the sulky protective bars taken along line 4—4 of FIG. 3;

FIG. 5 is a cross-sectional view of the sulky of the present invention taken along line 5—5 of FIG. 3;

FIG. 6 is a cross-sectional view of one of the sulky shafts, taken along line 6—6 of FIG. 3;

FIG. 7 is a cross-sectional view of the other sulky shaft taken along line 7—7 of FIG. 3;

FIG. 8 is a cross-sectional view taken along line 8—8 of FIG. 5;

FIG. 9 is a cross-sectional view of a segment of the arch axle of the sulky of the present invention, taken along line 9—9 of FIG. 3;

FIG. 10 is a cross-sectional view of a portion of the arch axle of the sulky of the present invention taken along line 10—10 of FIG. 3.

DESCRIPTION OF A PREFERRED EMBODIMENT

Figure 1:
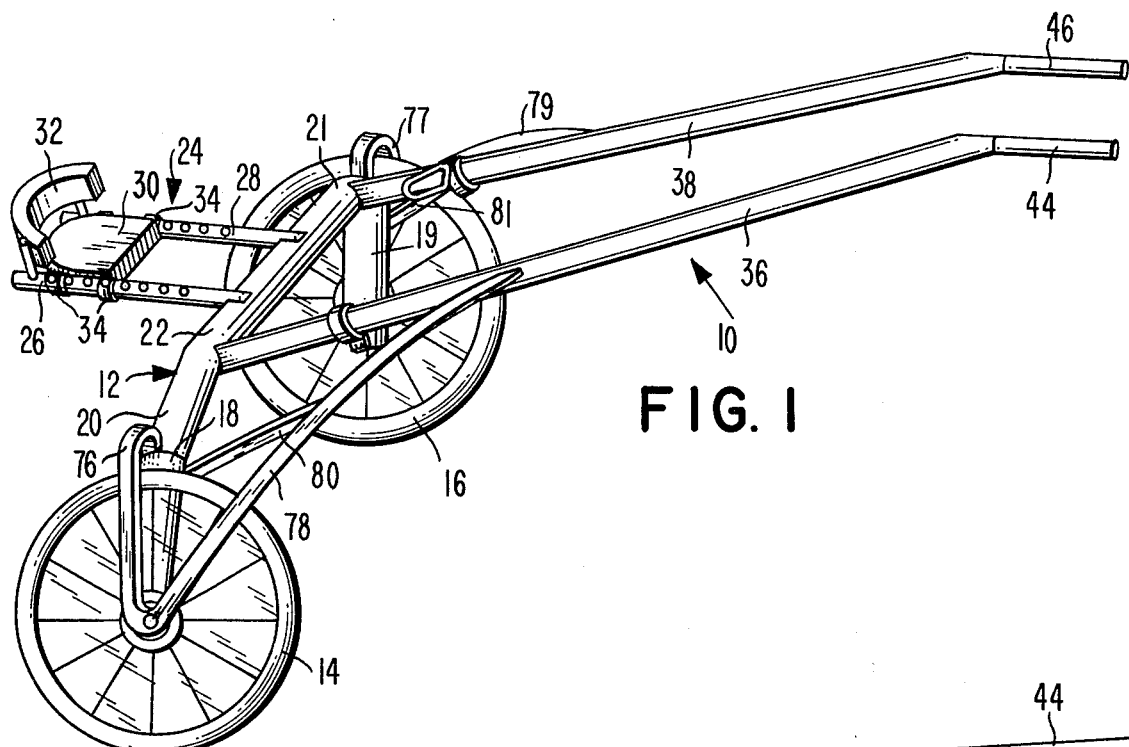
FIG. 1 is a perspective view of the sulky of the present invention.

Turning now to a more detailed consideration of the drawings, there is illustrated at 10 in FIG. 1 a sulky constructed in accordance with the principles of the present invention. The sulky consists of a main support arch 12 which extends across and forms the width of the sulky 10. The arch carries at its opposite ends a pair of wheels 14 and 16 secured on suitable axles. Since the support arch 12 extends all the way across the sulky and carries the wheels at its opposite ends, it performs the function of an axle, and may be referred to as an arch axle; accordingly, this term will be used herein interchangeably with the term support axle.

The support axle 12 is in the form of an angular arch and consists of five portions, or segments: first and second vertical end segments 18 and 19, first and second intermediate, angled sections 20 and 21, and a horizontal cross segment 22. These segments may be separately fabricated and secured in end to end relation as by welding, or may be fabricated as a single piece, forming a continuous arch structure.

Secured at the midpoint of the cross piece 22 is a driver's seat generally indicated at 24 and consisting of a pair of horizontal, rearwardly extending bars 26 and 28 suitably secured at their forward ends as by welding, bolting, or other known means to provide a firm support for a seat 30 and a back rest 32. The seat 30 may be secured to the rearwardly extending bars 26 and 28 by adjustable brackets 34 which may be clamped to the bars or otherwise fastened as by means of bolts passing through corresponding holes in the bars 26 and 28. The back rest may also be adjustably secured to the bars 26 and 28, if desired, or may be fixedly secured thereto.

Figure 2:
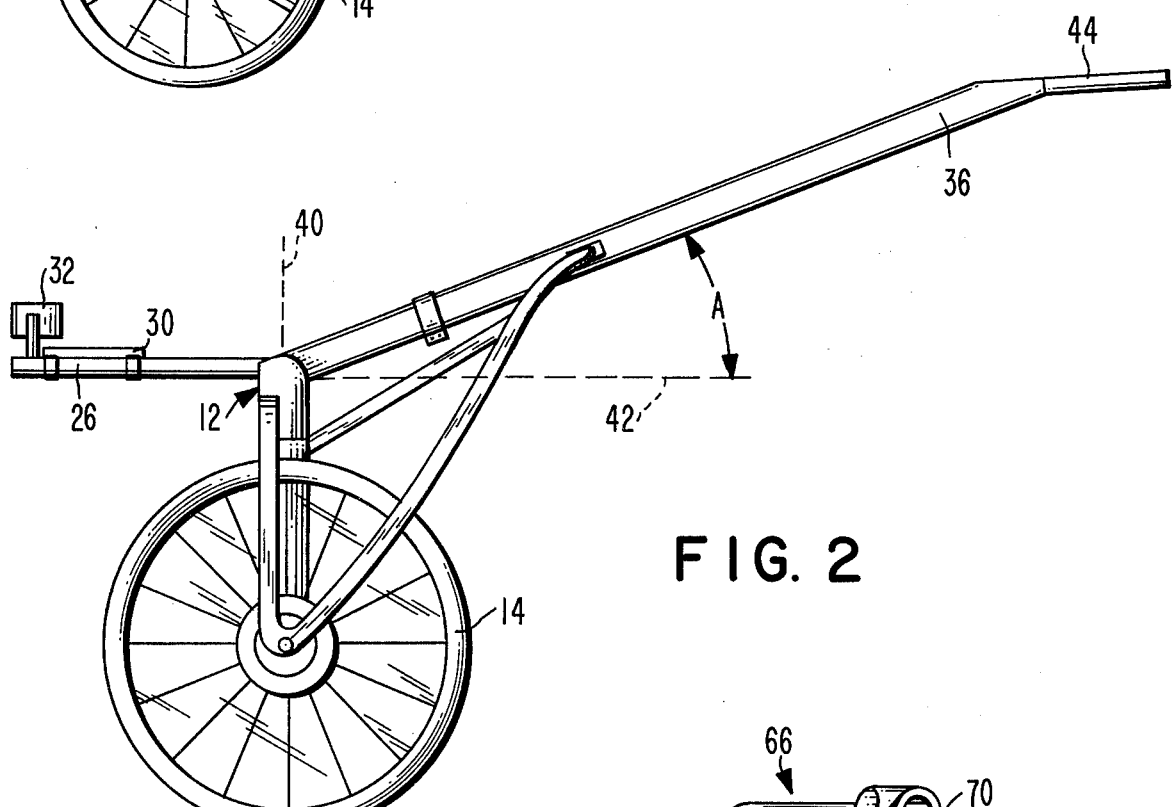
FIG. 2 is a diagrammatic side view of the sulky of the present invention.

Secured to the front of arch axle 12 at the approximate end of the horizontal segment 22 are a pair of shafts 36 and 38 which extend forwardly and are adapted to be secured to either side of the horse which draws the sulky. These shafts are secured to the arch axle in an angular manner which will vary with the size of the sulky, which in turn varies with the size of the horse to which it is to be harnessed. As illustrated in FIG. 2, when the sulky is in the normal, or racing, position which it would assume when it is hitched to a horse, the arch axle 12 lies in a generally vertical plane defined by line 40 with the support bars 26 and 28 for the seat lying in a generally horizontal plane defined by line 42. In this position, the shafts 36 and 38 extend forwardly and upwardly at an angle above the horizontal indicated by the letter A in FIG. 2, which angle may be on the order of 15 to 20 degrees, depending upon the relative sizes of the sulky and the horse. It will be noted that the terminal ends of the shafts are angled with respect to the main part of the shafts at 44 and 46 to provide a horizontal portion which engages the harness of the horse.

In FIG. 3, the shafts 36 and 38 are shown also to be angled inwardly from the arch axle at an angle which is dependent upon the size of the sulky and of the horse. If the shafts were to be extended, as indicated by the dotted lines 48 and 50, the angle between the shafts indicated by angle B in FIG. 3 would be approximately 10°.

As previously indicated, the component parts of the arch axle and shafts for the sulky of the present invention are of a light-weight, strong, slightly flexible steel alloy material so that this material produces an arch axle which flexes slightly when a load, such as the driver, is placed on the center portion 22, causing the end portions 18 and 19 to flex outwardly, so that the arch axle in effect has an elastic axis along which the end portions travel in such flexing motions. These parts are of a tubular material in the preferred embodiment, although if desired they may be of a solid configuration in the manner of the various support struts, illustrated in FIG. 4 and to be described in detail below. The tubular material is perferred for its lightness and relative strength which permits a reduction in the overall weight of the sulky while retaining the safety and performance characteristics required. The arch axle and shafts are constructed from tubular stock material which is formed in a tear drop-shape to provide minimum air flow resistance, and cross-sectional views of shafts 36 and 38 showing this construction are provided in FIGS. 5, 6 and 7. Although for purposes of illustration, the tubing illustrated in these figures appears to be thick-walled, it should be understood that in fact relatively thin-walled tubing is preferred to provide the desired flexibility and lightness. Further, the tubing may be formed with suitable ribbing for additional strength if desired.

FIGS. 8, 9 and 10 provide cross-sectional views of various portions of the arch axle 12, FIG. 8 providing a sectional view of the vertical end portion 18, FIG. 9 providing a cross-sectional view of the intermediate portion 20, and FIG. 10 providing a cross-sectional view of the central or horizontal portion 22 of the arch axle, it being understood that the corresponding portions on the opposite side of axle 12 have similar cross sections.

As may be seen in FIG. 5, the shafts 36 and 38 are connected to the arch axle with the wide edge 52 of the tear drop-shaped cross section being at the top and the narrow edge 54 being at the bottom, with the cross-sectional axis being angled from the vertical to provide a canting of the shaft. This canting is an important feature of the present invention in that it takes into account the air flow around the horse during the course of a race and provides a low drag profile to that air flow, thereby reducing the resistance of the sulky to the wind. The streamlined shape together with this canting arrangement eliminates the "choking" of air between the horse, the sulky and the driver and substantially reduces turbulence in the air flow around the horse's body.

The particular angle at which each shaft is canted will depend upon the length and taper of the shaft (angle B in FIG. 3) as well as the angle of the shaft with respect to the ground (angle A in FIG. 2), but it has been found that this angle of cant should be approximately 10°. As may be seen in FIGS. 6 and 7, the angle of cant is represented by the angle C which is the angle between a vertical line 56, passing through the lower edge 54 of the shaft, and a line 58 which represents the cross-sectional axis of the shaft and which passes through the largest cross-sectional dimension of the shaft; i.e., from the lower edge 54 through the maximum extension of the edge 52. This angle C is such that the cross-sectional axis 58 of the shaft is approximately parallel to the air flow around the horse, whereby the shaft presents a minimum resistance to the wind.

As indicated in FIGS. 8, 9 and 10, the tear drop-shaped cross section of the arch axle is such that the widest, or rounded, edge of the tubular material, indicated at 60 in FIGS. 3, 8, 9 and 10, faces forwardly of the sulky, while the tapered or narrow edge 62 faces rearwardly, again to provide minimum resistance to air flow.

Figure 11:
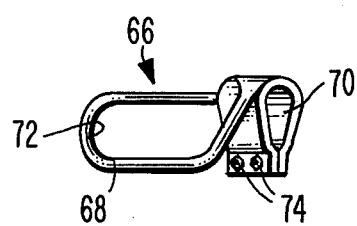
FIG. 11 is a perspective, enlarged view of a stirrup used on the sulky.

Mounted on each of shafts 36 and 38 by means of adjustable brackets are a pair of stirrups, or foot rests, 64 and 66, one of which is illustrated in greater detail in FIG. 11. As shown, the foot rest consists of a curved member 68, which may be tubular or may be a solid bar, secured as by welding at one end to a bracket 70. The foot rest extends inwardly of the shaft to which it is mounted and is shaped to form a heel curve 72 adapted to receive the heel of the driver's boot while the sulky is in motion. The opposite end of the foot rest is again secured to the bracket 70 which is in turn adjustably fastened to the shaft by suitable fasteners such as bolts 74. These bolts permit the foot rest to be adjusted on the shaft for the optimum position of the driver's foot and leg, whereby minimum resistance to the wind is presented by the driver.

The adjustable foot rests and the adjustable driver's seat described above enable the driver to position himself with respect to the arch axle of the sulky to not only provide minimum wind resistance, but to balance his weight on the arch axle in such a way that the motion of the horse during a race, the up and down motion of the driver as the sulky wheels roll along the ground, and the consequent flexing motion of the arch axle can be in resonance, or attuned to each other, so as to aid the horse. Without recognition of the interrelationship of the sulky, driver, and horse, the flexing motion of the sulky can occur at the wrong time in the struts of the horse, and can act to actually slow the horse down. A careful adjustment of the seat and the footrests is, therefore, important to the proper use of the invention.

The flexing of the sulky causes the arch axle to force the wheels 14 and 16 to tilt inwardly and outwardly with respect to the center line of the sulky, and this motion can result in a detrimental "scrubbing" action of the sulky tires across the ground. In accordance with the present invention, however, the wheel axles are mounted in the vertical segments 18 and 19 slightly behind the torsional axes of these segments and behind the elastic axis of the arch axle so that the flexing of the arch axle produces a slight outward and inward turning of the wheels as the arch axle flexes and the wheels move in and out. This turning of the wheels may be described as a castering effect, which improves the tracking of the sulky by reducing the scrubbing of the tires, and thus reducing their drag.

For added safety and strength, the sulky also incorporates reinforcing and protective struts or bars 76 through 81. The safety bars 76 and 77 are secured to the arch axle at the tops of the vertical elements 18 and 19, respectively, extend out over the wheels 14 and 16, and are secured to the outer ends of axles 82 and 84 on which the wheels 14 and 16 are mounted. These safety bars serve not only to provide added support to the axle, but also to prevent the wheels from becoming caught on the fence posts and rails conventionally provided along sulky racing tracks. Without such protective bars, the wheels could become entangled and cause serious injury to the driver and/or the horse, particularly where the fence does not include hub rails. The forwardly extending reinforcing bars 78 and 79 also protect the wheels from becoming entangled in the fencing, but in addition serve to provide support and lateral reinforcement to the shafts 36 and 38. As indicated in the drawings, these reinforcement bars may be continuous with the safety bars 76 and 77, respectively, or may be separately secured to the axles 82 and 84. Further support is provided by braces 80 and 81 which extend from the arch axle forwardly to the reinforcement bars 78 and 79, respectively.

The reinforcement and safety bars 78 through 81 are preferably thin, flat bars of a generally oval cross section as illustrated in FIG. 4 for bar 78, and may be of a solid construction rather than tubular, if desired. It should be noted that the bars are so arranged as to present their smallest dimensions to the flow of air during motion of the sulky. To this end, the reinforcing bars 78 and 79 are twisted through a 90° turn so that their thinnest dimensions are essentially vertical at the connection to the wheel hub, or axle, and are essentially horizontal at their connections to their respective shafts.

The wheels 16 and 18 are of conventional construction, preferably of spoked construction with rubber tires. As is usually done, the spokes may be covered by a suitable shield, secured at the hub of the wheel, to prevent injury during a race.

A sulky constructed in accordance with the foregoing features has been carefully tested not only under laboratory conditions but in actual races and has been found to provide a marked reduction in wind resistance, as opposed to prior sulkys, and has provided a startling improvement in the performance of horses which have used it. The uncluttered and simple design of the present sulky, together with the streamlined construction of the arch axle and shafts, the canting of the shafts and their angular relationship to the arch axle, the flexibility of the sulky, and the like all combine to reduce the wind drag and assist the horse in its gait. In tests run with the present sulky, it was found that the wind load, or drag, was reduced by between 6 and 10 pounds, compared to prior sulkys, a considerable difference when a horse race may cover a mile or more. It has been found that this reduction results not only in faster starts for the horse, but in an overall sustained increase in pace which enables the horse to reduce its elapsed time for a given distance by a substantial amount.

Thus, there has been described a new and novel sulky which, when constructed in accordance with the present invention, provides reduced wind resistance and increased performance by a horse. Although the invention is shown in terms of a specific embodiment thereof, it will be apparent to those of skill in the art that variations and modifications can be made in the specific details thereof without departing from the true spirit and scope of the invention as described in the following claims.

What is claimed is:

1. A sulky for use in harness horse racing, including an arch axle frame having an elastic axis and having first and second ends, wheel means including an axle and a wheel secured to each of said first and second ends of said arch axle frame, the rotational axes of said wheel means being placed aft of the elastic axis of said arch axle frame to produce a drag-reducing castering action in said wheel means, and an adjustable seat secured to an extending aft of said arch axle frame, the improvement comprising:

a pair of spaced upwardly and forwardly extending, flexible shafts secured to said arch axle on either side of said seat, said shafts being angled inwardly toward each other and having a tear drop-shaped, streamlined cross section with one longitudinal edge being rounded and the opposite longitudinal edge being tapered, the shafts being canted so that the cross-sectional axes of said shafts diverge downwardly and outwardly at an angle parallel to the direction of air flow about a horse harnessed to said sulky.

2. The sulky of claim 1, wherein said arch axle frame has a tear drop-shaped, streamlined cross section with one longitudinal edge being rounded and facing in a forward direction and the opposite longitudinal edge being tapered in a rearward direction.

3. The sulky of claim 2, wherein said shafts and said arch axle frame are tubular, and constructed of high strength steel.

4. The sulky of claim 3, wherein the first and second ends of said arch axle frame comprise first and second substantially vertical end segments, and wherein said arch axle frame further comprises a substantially horizontal central segment joined to said first and second end segments by corresponding first and second angled, intermediate segments, said shafts being connected to said arch axle frame at the junctures of said central segment and said intermediate segments at an angle of cant of about 10° from the vertical.

5. The sulky of claim 4, wherein said shafts are connected to said arch axle frame at an angle of between 15° and 20° from the horizontal when said arch axle frame is in a vertical plane, and wherein said shafts are angled inwardly toward each other to form an angle of about 10° between the shafts.

6. The sulky of claim 5, further including safety bar means secured to said arch axle frame, extending over each wheel, and connected to its axle, said safety bar means each comprising a thin, flat bar of a generally oval cross section having its smallest dimension facing the flow of air during motion of the sulky.

7. The sulky of claim 6, further including reinforcing bar means secured between each wheel axle and a corresponding one of said shafts, said reinforcing bar means each comprising a thin flat bar of generally oval cross section with its largest dimension being in a generally vertical plane at the wheel axle and in a generally horizontal plane at the shaft, whereby its smallest dimension faces the flow of air during motion of the sulky.

* * * * *